United States Patent [19]

Koberstein et al.

[11] Patent Number: 5,024,985

[45] Date of Patent: Jun. 18, 1991

[54] SUPPORT MATERIAL FOR THREE-WAY CATALYSTS CONTAINING PLATINUM GROUP METAL AND HAVING REDUCED TENDENCY FOR $H_2S$ EMISSION

[75] Inventors: Edgar Koberstein, Alzenau; Bernd Engler, Hanau; Rainer Domesle, Alzenau-Kälberau; Peter Schubert, Hanau, all of Fed. Rep. of Germany

[73] Assignee: Degussa Aktiengesellschaft, Frankfurt am Main, Fed. Rep. of Germany

[21] Appl. No.: 471,486

[22] Filed: Jan. 29, 1990

[30] Foreign Application Priority Data

Feb. 1, 1989 [DE] Fed. Rep. of Germany ....... 3902913

[51] Int. Cl.$^5$ ..................... B01J 21/04; B01J 23/10; B01J 23/40
[52] U.S. Cl. ................................. 502/304; 502/439; 423/213.5
[58] Field of Search ................. 502/304, 439; 423/213.5

[56] References Cited

U.S. PATENT DOCUMENTS

| | | | |
|---|---|---|---|
| 3,993,572 | 11/1976 | Hindin et al. | 423/213.5 X |
| 4,331,565 | 5/1982 | Schaefer et al. | 423/213.5 X |
| 4,663,137 | 5/1987 | Chane-Ching et al. | 502/304 |
| 4,714,694 | 12/1987 | Wan et al. | 502/304 |
| 4,760,044 | 7/1988 | Joy et al. | 423/213.5 X |
| 4,900,712 | 2/1990 | Bar-Ilan et al. | 502/304 |
| 4,910,180 | 3/1990 | Berndt et al. | 502/304 |

*Primary Examiner*—W. J. Shine
*Assistant Examiner*—Douglas J. McGinty
*Attorney, Agent, or Firm*—Beveridge, DeGrandi & Weilacher

[57] ABSTRACT

A support material for three-way catalysts containing platinum group metal and having reduced tendency for $H_2S$ emission formed of an annealed, spray-dried combination of aluminum oxide and cerium oxide.

17 Claims, No Drawings

SUPPORT MATERIAL FOR THREE-WAY CATALYSTS CONTAINING PLATINUM GROUP METAL AND HAVING REDUCED TENDENCY FOR H₂S EMISSION

INTRODUCTION AND BACKGROUND

The present invention relates to a support material for three-way catalysts containing platinum group metal, which catalysts are employed for the purification of exhaust gases of internal combustion engines. More especially, the support material of this invention is optionally doped with one or more oxides of non-noble metals. The catalysts for the purification of car exhaust gases produced in accordance with the invention have a reduced tendency for H$_2$S emission. In more particular detail, the present invention relates to support material consisting of active aluminum oxide and at least 10 wt.% of cerium oxide, relative to the sum of all support constituents.

Modern high-performance exhaust gas catalysts store considerable amounts of sulfur dioxide originating from the fuel in the form of sulfate and sulfite, during the lean mode operation of the engine. When enriching the fuel mixture, for example when accelerating the vehicle, the sulfur compounds thus stored by the catalyst are reduced by the hydrogen present in the exhaust gas and released rapidly into the atmosphere in the form of hydrogen sulfide. As hydrogen sulfide emission of this type is undesirable for reasons relating to environmental protection and health, there was an urgent need to suppress it.

European application 0 244 127 proposes the addition of nickel to catalysts in order to combat the problem. However, as nickel and its compounds are not completely harmless as far as health is concerned, the preparation and handling of catalysts containing nickel require costly safety measures. There was therefore a need to develop car exhaust gas catalysts which considerably suppress hydrogen sulfide emission even without the presence of nickel additives.

As high-performance catalysts for car exhaust gas purification currently have higher cerium oxide contents, and cerium oxide shows a strong tendency to store sulfur dioxide, the emission of hydrogen sulfide is predominantly influenced by the form in which the cerium oxide is present; namely, as a component of the catalyst support material or as the support material.

It has now been found that the problem outlined can be solved if at least the cerium oxide component of the support material, and preferably a predominant part of all cerium oxide present, is used in the form of spray dried particles.

SUMMARY OF THE INVENTION

An object of the invention is therefore to provide a support material for three-way catalysts containing platinum group metal for the purification of exhaust gases of internal combustion engines and optionally being doped with one or more oxides of non-noble metals, having reduced tendency for H$_2$S emission, consisting of active aluminum oxide and at least 10 wt.% of cerium oxide, relative to the sum of all support constituents.

In attaining the above and other objects, one feature of the invention resides in spray-drying an aqueous suspension of 0–90 parts by weight of active, aluminum oxide and/or its particular precursor, and 10–100 parts by weight of cerium oxide or of one soluble and/or insoluble precursor of the cerium oxide, calculated as CeO$_2$, and by annealing the material thus obtained for 15 minutes to 24 hours at 350–1,140, preferably 700°–1,050° C. The aluminum oxide is optionally lattice-stabilized.

The support material of the invention may thus consist of mixtures of Al$_2$O$_3$ and cerium oxide, or of cerium oxide alone. The essential feature is that the Al$_2$O$_3$-cerium oxide mixture or the cerium oxide alone, has been subjected to spray-drying from an aqueous suspension. Instead of the oxides, precursors thereof, for example salts, such as cerium (III) nitrate, ammonium cerium (IV) nitrate, cerium (III) chloride, cerium (III) oxalate, cerium (III) acetate and others, or hydroxides, may be used.

A further essential feature of the invention resides in following the spray-drying by annealing under the conditions given, to give the spray-dried particles their final properties. Active aluminum oxide is preferably used in the form of an aluminum oxide of the so-called transition series, such as $\delta$-Al$_2$O$_3$, obtained by precipitation and calcining, or as finely divided Al$_2$O$_3$ obtained pyrogenically. An equally well suited aluminum oxide precursor is pure pseudo-boehmite or boehmite, or a mixture of pseudo-boehmite and boehmite.

Equally suitable precursors consist of pseudo-boehmite and/or boehmite with aluminum oxide of the transition series and/or with pyrogenic aluminum oxide.

The novel support materials may be applied as bulk material in the form of extrudates, granules or pressed parts or as a coating on inert supports They may be doped with oxidic non-noble metals, such as TiO$_2$, ZrO$_2$, La$_2$O$_3$, CaO, BaO, Fe$_2$O$_3$ and others, which modify the effect of the catalytically active platinum group elements.

The support materials of the invention can be fixed per se with adequate adhesive strength when applied by means of dispersion to conventional, catalytically inert ceramic or metallic structural reinforcers, or carriers in the bulk material, monolith or honeycomb forms. According to an advantageous variant of the invention, this property can be improved further if the spray-dried support material obtained in accordance with the invention is combined with up to a further 80 parts by weight of a conventional gamma-aluminum oxide or of a precursor of the same and/or of a conventional cerium oxide, calculated as CeO$_2$, or of one of its soluble and/or insoluble precursors. If precursors of one or both oxides are used, calcining may then be carried out as part of the process to prepare the oxide form. The temperatures and times required to decompose the precursors are sufficient for this process However, for the preparation of monolith catalysts, the calcining can only be carried out on the coating of support material obtained by dispersion coating

DETAILED DESCRIPTION OF THE INVENTION

The invention is explained in more detail below in the illustrative examples.

COMPARATIVE EXAMPLE 1

A ceramic honeycomb reinforcer of cordierite having 62 cells/cm$^2$ was coated with 160 grams of an oxide mixture per liter reinforcer volume. An aqueous suspension having a solids content of 52 wt.% and the following composition for the oxide mixture present after activation was used for this purpose:

| 61.4 parts by weight | γ-aluminum oxide |
|---|---|
| 36.8 parts by weight | cerium oxide, applied as cerium (III) acetate |
| 1.8 parts by weight | zirconium oxide, applied as zirconyl acetate. |

After covering the reinforcer body with the oxide layer, it was dried at 120° C. and then activated for 15 minutes at 350° C. and for a further 2 hours at 600° C. The honeycomb thus coated was then immersed in an aqueous solution of hexachloroplatinic acid and rhodium chloride in a weight ratio of 5:1 and dried. The total noble metal content was 1.41 g/l of support volume after this treatment. After annealing at 550° C. for 2 hours in air, reduction of the noble metal salts deposited on the support material then took place in the hydrogen stream at a temperature of 550° C. for a period of 4 hours.

EXAMPLE 1

The same ceramic honeycomb reinforcer as in Comparative Example 1 was coated with the same oxide layer, and essentially dried and activated in the same manner as described in Comparative Example 1. However, in contrast to Comparative Example 1, a $CeO_2$-$Al_2O_3$ mixture prepared by spray-drying and having a mass ratio $CeO_2$: $Al_2O_3$ of 1:1 was used as a cerium oxide component. The $Al_2O_3$ portions in the oxide mixture were balanced with the additional $\delta$-$Al_2O_3$.

The spray particles were prepared in a commercially available spray drier by spraying a solution suspension, consisting of pseudo-boehmite, water and dissolved cerium (III) nitrate. The product thus obtained was annealed in air for 12 hours at 350° C. and for a further 6 hours at 1,000° C.

The noble metal was applied to the coated support in accordance with the method of Comparative Example 1.

EXAMPLE 2

This catalyst was prepared in the same way as in Example 1. However, when preparing the spray particles, pyrogenic aluminum oxide (aluminum oxide C made by Degussa AG) was used instead of pseudo-boehmite. The spray particles were annealed in this case for 12 hours at 350° C. and then for 12 hours at 1,000° C.

EXAMPLE 3

The catalyst was prepared in the same way as in Example 2. However, the duration of the second annealing step was 24 hours for the preparation of the spray particles.

EXAMPLE 4

The reinforcer body was covered with the oxide layer and the noble metals were applied in accordance with the method in Example 2. The difference to Example 2 was that the mass ratio of spray particles used as the cerium oxide component was $CeO_2$: $Al_2O_3$=3:7. Annealing of the spray particles before using as washcoat component was carried out in air for 6 hours at 1,000° C.

EXAMPLE 5

This catalyst was prepared in accordance with Example 4 with the difference that the composition of the spray particles was $CeO_2$: $Al_2O_3$=1:9.

EXAMPLE 6

This catalyst was prepared in accordance with Example 2. However, the difference was that the second annealing step for the spray particles, in air for 12 hours at 1,000° C., was dispensed with.

EXAMPLE 7

This catalyst was prepared in accordance with Example 2 with the difference that the crude particles coming from the spray dryer were annealed in air for 12 hours at 700° C.

EXAMPLE 8

The catalyst was prepared in accordance with Example 7. The difference was that the spray particles were annealed in air for 12 hours at 800° C. instead.

EXAMPLE 9

The catalyst was prepared in accordance with Example 7. The difference was that the spray particles were annealed in air for 12 hours at 950° C. instead.

EXAMPLE 10

The catalyst was prepared in accordance with Example 7. The difference was that the spray particles were annealed in air for 12 hours at 1,050° C. instead.

EXAMPLE 11

The catalyst was prepared in accordance with Example 7. The difference was that the spray particles were annealed in air for 15 minutes at 1,140° C. instead.

COMPARATIVE EXAMPLE 2

A ceramic honeycomb (62 cells/cm$^2$) was coated, dried and activated in the same way as described in Comparative Example 1, with 100 g/l grams of an oxide mixture per liter reinforcer volume. The oxide layer had the following composition:

| 90 parts by weight | γ-aluminum oxide |
|---|---|
| 10 parts by weight | cerium oxide, applied as cerium (III) nitrate. |

The noble metals platinum and rhodium are applied and activated in accordance with the method given in Comparative Example 1. Hexachloroplatinic acid served as the platinum component, rhodium nitrate served as the rhodium component. The total noble metal content of the finished catalyst was 1.41 g/l of support volume. The Pt/Rh ratio was in turn 5:1.

EXAMPLE 12

The catalyst was prepared essentially in accordance with Comparative Example 2. However, a cerium oxide prepared by spray drying and annealing was used as cerium oxide component.

An aqueous cerium (III) acetate solution (18 g/100 ml) was sprayed in a spray-drier to prepare the cerium oxide spray particles. The crude product obtained was annealed for 4 hours at 350° C. and for a further 24 hours at 950° C.

COMPARATIVE EXAMPLE 3

A ceramic honeycomb reinforcer (62 cells/cm$^2$) was coated, dried and activated in the same manner as described in Comparative Example 1 with 120 g/l of support volume of the following oxide mixture:

| | |
|---|---|
| 20 parts by weight | γ-aluminum oxide |
| 80 parts by weight | cerium oxide, applied as ammonium cerium (IV) nitrate. |

The charging with noble metals and activation thereof also took place analogously to Comparative Example 1.

EXAMPLE 13

This catalyst was prepared essentially in the same way as Comparative Example 3, with the difference that a cerium oxide/aluminum oxide mixture prepared by spray drying and annealing was used as cerium oxide component.

The spray particles were prepared in a spray drier by spraying a suspension solution consisting of δ-aluminum oxide, water and dissolved ammonium cerium (IV) nitrate.

The product thus obtained was activated for 6 hours at 350° C. and for a further 18 hours at 980° C. The spray particles thus treated had a $CeO_2/Al_2O_3$ mass ratio of 80:20.

EXAMPLE 14

The catalyst was prepared essentially in the same way as Comparative Example 3. However, one difference was that the δ-$Al_2O_3$ was applied exclusively by means of previously prepared cerium oxide/$Al_2O_3$ spray particles with a mass ratio of 1:1. Balancing of the cerium oxide content took place by means of adding ammonium cerium (IV) nitrate.

The spray particles were prepared in accordance with the process in Example 2. However, the difference was that the spray particles were annealed for 20 hours at 900° C.

Testing the Catalysts

The catalysts prepared in accordance with the preparation examples above were tested with regard to their properties during the conversion of the exhaust gas pollutants carbon monoxide, hydrocarbons and nitrogen oxides, and as regard their hydrogen sulfide emission characteristics, in a test plant which operates using a synthetic gas mixture, corresponding to that of an internal combustion engine. The dimensions of the test catalysts were generally cylindrical (diameter × height = 25 × 76 mm). The space velocity was 50,000 h$^{-1}$. Propane was used as an example of a hydrocarbon component.

Test cycle to determine the $H_2S$ emission characteristics ($H_2S$ test cycle)

The test cycle essentially consists of three measuring phases (see Test scheme FIG. 1). The phase I describes the direct, stationary conversion of $SO_2$ to $H_2S$ under reduced (rich) exhaust gas conditions in the catalyst. The phase II serves for defined sulfur dioxide storage (it is stored as TO.SO or TO.SO ; TO = Support oxide). In phase III (sulfur discharging), the hydrogen sulfide emission is measured integrally after 3 to 15 minutes operating time under rich exhaust gas conditions.

The sulfur storage and emission behavior of exhaust gas catalysts can be determined quantitatively using this test cycle. The total emission of hydrogen sulfide (sum total from measuring phase I and III) is of practical significance and was therefore used as a discriminatory measuring parameter. The exhaust gas temperature upstream of the catalyst was 470° C. for all three measuring phases. The following synthetic mixture was used for the rich exhaust gas (λ=0.92):

TABLE 1

| Composition of the synthetic exhaust gas for λ = 0.92 | |
|---|---|
| Component | Volume % |
| $N_2$ | 76.69 |
| $CO_2$ | 10 |
| $H_2O$ | 10 |
| $O_2$ | 0.25 |
| $CO/H_2 = 3/1$ | 2.85 |
| NO | 0.15 |
| $C_3H_8$ | 0.06 |
| $SO_2$ | 0.002 |

The lean exhaust gas mixture (λ=1.02) differs from the rich mixture only in the oxygen and $CO/H_2$ content; the gas mixture is balanced to 100 volume % using nitrogen.

TABLE 2

| Composition of the synthetic exhaust gas for λ = 1.02 | |
|---|---|
| Component | Volume % |
| $N_2$ | 77.65 |
| $O_2$ | 1.48 |
| $CO/H_2 = 3/1$ | 0.66 |

See above for further details

Catalytic Activity

The conversion of the pollutants CO, HC and NO was determined at an exhaust gas temperature of 450° C. under equilibrium conditions. To characterize the cold-start behavior of the catalysts, the temperature of the exhaust gas was raised linearly from 75° C. to 450° C. at a heating rate of 15° C./minute. The conversion of pollutants was thus recorded at the same time. The temperature at which a degree of conversion of 50% is achieved, are marked briefly with the index 50. The index serves as a measure of the starting ability of the catalyst for the conversion of the particular pollutant component.

To characterize the aging behavior, the catalysts were treated in air for 24 hours at 950° C.

TABLE 3

| Composition of the synthetic exhaust gas for λ = 1.01 (lean) | |
|---|---|
| Component | Volume % |
| $N_2$ | 72.55 |
| $CO_2$ | 14.00 |
| $H_2O$ | 10.00 |
| $O_2$ | 1.42 |
| CO | 1.40 |
| $H_2$ | 0.47 |
| NO | 0.10 |
| $C_3H_8$ | 0.06 |

The gas mixture for the simulation of a rich exhaust gas (λ=0.98) differs from the composition mentioned above only in that the oxygen portion was selected to be correspondingly smaller and the nitrogen portion correspondingly greater.

The total hydrogen sulfide emissions of the fresh catalysts which are considerably reduced when applying the preparation process of the invention, are of technical significance (see Table 4). The activities with regard to the conversion of the pollutants carbon monoxide (CO), hydrocarbon (HC) and nitrogen oxide (NO), are only slightly influenced by the preparation of the exhaust gas catalysts (Tables 5 to 8). The latter is true both for fresh and for aged catalysts.

Further variations and modifications of the foregoing will be apparent to those skilled in the art and are intended to be encompassed by the claims appended hereto.

German priority application P 39 02 913.1 is relied on and incorporated herein by reference.

TABLE 5-continued

| Fresh catalyst | light-off temperature/°C. | | | | | |
|---|---|---|---|---|---|---|
| | $\lambda = 0.98$ | | | $\lambda = 1.01$ | | |
| | $CO_{50}$ | $HC_{50}$ | $NO_{50}$ | $CO_{50}$ | $HC_{50}$ | $NO_{50}$ |
| Example 6 | 152 | 234 | 158 | 148 | 175 | — |
| Example 7 | 154 | 241 | 158 | 150 | 183 | — |
| Example 8 | 156 | 244 | 152 | 149 | 183 | — |
| Example 9 | 155 | 231 | 151 | 147 | 178 | — |
| Example 10 | 159 | 239 | 162 | 148 | 173 | — |
| Example 11 | 153 | 235 | 147 | 149 | 176 | — |
| Comp. Exam. 2 | 215 | 287 | 201 | 199 | 230 | — |
| Example 12 | 217 | 280 | 203 | 203 | 229 | — |
| Comp. Exam. 3 | 193 | 326 | 186 | 187 | 233 | — |
| Example 13 | 195 | 315 | 182 | 183 | 234 | — |
| Example 14 | 191 | 317 | 185 | 184 | 231 | — |

TABLE 6

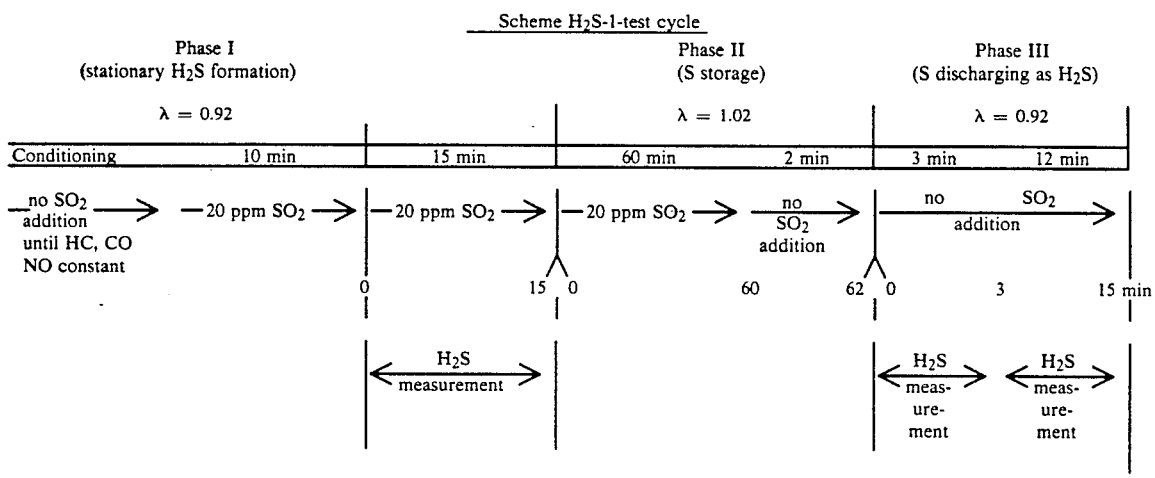

Scheme H₂S-1-test cycle

TABLE 4

Hydrogen sulfide emission behavior of the catalysts

| Catalyst | Total hydrogen sulfide emission (mg S/m³ of exhaust gas) Fresh Catalyst |
|---|---|
| Comparative Example 1 | 222 |
| Example 1 | 168 |
| Example 2 | 139 |
| Example 3 | 69 |
| Example 4 | 162 |
| Example 5 | 125 |
| Example 6 | 202 |
| Example 7 | 189 |
| Example 8 | 172 |
| Example 9 | 151 |
| Example 10 | 133 |
| Example 11 | 112 |
| Comparative Example 2 | 117 |
| Example 12 | 78 |
| Comparative Example 3 | 241 |
| Example 13 | 161 |
| Example 14 | 168 |

TABLE 5

| Fresh catalyst | light-off temperature/°C. | | | | | |
|---|---|---|---|---|---|---|
| | $\lambda = 0.98$ | | | $\lambda = 1.01$ | | |
| | $CO_{50}$ | $HC_{50}$ | $NO_{50}$ | $CO_{50}$ | $HC_{50}$ | $NO_{50}$ |
| Comp. Exam. 1 | 156 | 261 | 161 | 150 | 187 | — |
| Example 1 | 157 | 207 | 166 | 152 | 180 | — |
| Example 2 | 154 | 234 | 154 | 148 | 171 | — |
| Example 3 | 168 | 260 | 179 | 161 | 182 | — |
| Example 4 | 171 | 217 | 179 | 168 | 185 | — |
| Example 5 | 162 | 207 | 168 | 147 | 177 | — |

| Aged catalyst | light-off temperature/°C. | | | | | |
|---|---|---|---|---|---|---|
| | $\lambda = 0.98$ | | | $\lambda = 1.01$ | | |
| | $CO_{50}$ | $HC_{50}$ | $NO_{50}$ | $CO_{50}$ | $HC_{50}$ | $NO_{50}$ |
| Comp. Exam. 1 | 222 | 342 | 226 | 208 | 285 | — |
| Example 1 | 213 | 317 | 218 | 199 | 273 | — |
| Example 2 | 208 | 321 | 211 | 200 | 269 | — |
| Example 3 | 212 | 333 | 214 | 203 | 275 | — |
| Example 4 | 215 | 319 | 217 | 200 | 277 | — |
| Example 5 | 220 | 321 | 223 | 209 | 285 | — |
| Example 6 | 209 | 332 | 215 | 203 | 268 | — |
| Example 7 | 207 | 324 | 211 | 186 | 287 | — |
| Example 8 | 180 | 317 | 187 | 173 | 283 | — |
| Example 9 | 198 | 319 | 205 | 190 | 278 | — |
| Example 10 | 198 | 323 | 202 | 182 | 278 | — |
| Example 11 | 198 | 317 | 200 | 181 | 283 | — |
| Comp. Exam. 2 | 280 | — | 265 | 267 | 310 | — |
| Example 12 | 278 | — | 268 | 269 | 312 | — |
| Comp. Exam. 3 | 275 | — | 260 | 259 | 306 | — |
| Example 13 | 278 | — | 261 | 257 | 309 | — |
| Example 14 | 273 | — | 259 | 259 | 309 | — |

TABLE 7

| Fresh catalyst | Equilibrium conversion [%] | | | | | |
|---|---|---|---|---|---|---|
| | $\lambda = 0.98$ (rich) | | | $\lambda = 1.01$ (lean) | | |
| | CO | HC | NO | CO | HC | NO |
| Comp. Exam. 1 | 81 | 96 | 100 | 99 | 99 | 10 |
| Example 1 | 94 | 96 | 100 | 99 | 99 | 14 |
| Example 2 | 84 | 97 | 100 | 99 | 99 | 16 |
| Example 3 | 83 | 96 | 100 | 99 | 99 | 13 |
| Example 4 | 90 | 97 | 100 | 99 | 99 | 11 |
| Example 5 | 91 | 93 | 100 | 99 | 99 | 14 |
| Example 6 | 85 | 95 | 100 | 99 | 99 | 18 |
| Example 7 | 83 | 96 | 100 | 99 | 99 | 11 |
| Example 8 | 84 | 92 | 100 | 99 | 99 | 15 |
| Example 9 | 83 | 95 | 100 | 99 | 99 | 15 |

TABLE 7-continued

| Fresh catalyst | Equilibrium conversion [%] | | | | | |
| --- | --- | --- | --- | --- | --- | --- |
| | λ = 0.98 (rich) | | | λ = 1.01 (lean) | | |
| | CO | HC | NO | CO | HC | NO |
| Example 10 | 82 | 97 | 100 | 99 | 99 | 16 |
| Example 11 | 90 | 97 | 100 | 99 | 99 | 15 |
| Comp. Exam. 2 | 79 | 89 | 99 | 99 | 99 | 25 |
| Example 12 | 81 | 86 | 99 | 99 | 99 | 26 |
| Comp. Exam. 3 | 91 | 46 | 99 | 99 | 99 | 21 |
| Example 13 | 90 | 49 | 99 | 99 | 99 | 23 |
| Example 14 | 90 | 48 | 99 | 99 | 99 | 21 |

TABLE 8

| Aged catalyst | Equilibrium conversion [%] | | | | | |
| --- | --- | --- | --- | --- | --- | --- |
| | λ = 0.98 (rich) | | | λ = 1.01 (lean) | | |
| | CO | HC | NO | CO | HC | NO |
| Comp. Exam. 1 | 80 | 15 | 99 | 99 | 86 | 23 |
| Example 1 | 92 | 36 | 99 | 99 | 87 | 25 |
| Example 2 | 91 | 23 | 99 | 99 | 86 | 24 |
| Example 3 | 89 | 13 | 99 | 99 | 85 | 26 |
| Example 4 | 92 | 34 | 99 | 99 | 86 | 24 |
| Example 5 | 90 | 33 | 99 | 99 | 87 | 22 |
| Example 6 | 82 | 17 | 99 | 99 | 91 | 21 |
| Example 7 | 93 | 39 | 99 | 99 | 91 | 19 |
| Example 8 | 91 | 33 | 99 | 99 | 88 | 23 |
| Example 9 | 92 | 18 | 99 | 99 | 89 | 24 |
| Example 10 | 95 | 23 | 99 | 99 | 83 | 26 |
| Example 11 | 95 | 41 | 99 | 99 | 86 | 19 |
| Comp. Exam. 2 | 76 | 11 | 97 | 99 | 95 | 24 |
| Example 12 | 73 | 14 | 97 | 99 | 97 | 25 |
| Comp. Exam. 3 | 67 | 9 | 99 | 99 | 96 | 22 |
| Example 13 | 69 | 10 | 99 | 99 | 96 | 23 |
| Example 14 | 67 | 10 | 99 | 99 | 97 | 23 |

We claim:

1. A support material for a three-way catalyst containing platinum group metal for the purification of exhaust gases of an internal combustion engine having reduced tendency for $H_2S$ emission, comprising a mixture of active aluminum oxide and at least 10 wt.% of cerium oxide as the support or cerium oxide alone as the support, relative to the sum of all support constituents, produced by spray-drying an aqueous suspension of 0-90 parts by weight of an active, aluminum oxide and/or its particular precursor, and 10-100 parts by weight of cerium oxide or of a soluble and/or insoluble precursor of the cerium oxide, calculated as $CeO_2$, and by annealing the material thus obtained for 15 minutes to 24 hours at 350°-1,140° C.

2. The support material according to claim 1, wherein the support is doped with one or more oxides of non-noble metals.

3. The support material according to claim 1, wherein the aluminum oxide is lattice-stabilized.

4. The support material according to claim 1, wherein the annealing is at 700°-1,050° C.

5. The support material according to claim 1, which is obtained by using aluminum oxide of the transition series which is obtained by precipitation and calcining, or pyrogenic aluminum oxide as the active aluminum oxide.

6. The support material according to claim 1, which is obtained by using pseudo-boehmite and/or boehmite as the aluminum oxide precursor.

7. The support material according to claim 1 which is obtained by using mixtures of pseudo-boehmite and/or boehmite with aluminum oxide of the transition series and/or with pyrogenic aluminum oxide.

8. The support material according to claim 1, wherein the support material is combined with up to 80 parts by weight of a gamma-aluminum oxide or of a precursor of gamma-alumina and/or of a cerium oxide, calculated as $CeO_2$, or of one of its soluble and/or insoluble precursors.

9. A method for making a support material for a three-way catalyst containing platinum group metal for the purification of exhaust gases of internal combustion engines and optionally being doped with one or more oxides of non-noble metals, and having reduced tendency for $H_2S$ emission, comprising spray-drying an aqueous suspension of 0-90 parts by weight of an active, optionally lattice-stabilized aluminum oxide and/or its particular precursor, and 10-100 parts by weight of cerium oxide or of one soluble and/or insoluble precursor of the cerium oxide, calculated as $CeO_2$, and annealing the material thus obtained for 15 minutes to 24 hours at 350-1,140, to thereby obtain a support formed of an active aluminum oxide and at least 10 wt.% of cerium oxide, relative to the sum of all support constituents.

10. The method according to claim 9, wherein aluminum oxide of the transition series recovered by precipitation and calcining, or pyrogenic aluminum oxide is used as the active aluminum oxide.

11. The method according to claim 9, wherein pseudo-boehmite and/or boehmite is used as the aluminum oxide precursor.

12. The method according to claim 9, wherein mixtures of pseudo-boehmite and/or boehmite with aluminum oxide of the transition series and/or with pyrogenic aluminum oxide are used.

13. The method according to claim 9, wherein the spray dried support material is combined with up to 80 parts by weight of a conventional gamma-aluminum oxide or of a precursor of the same and/or of a conventional cerium oxide, calculated as $CeO_2$, or of one of its soluble and/or insoluble precursors.

14. The method according to claim 9, wherein the annealing is at 700°-1,050° C.

15. A three-way catalyst comprising a platinum group metal deposited on the support according to claim 1.

16. A three way catalyst for the purification of exhaust gases of an internal combustion engine, which catalyst has a reduced tendency for $H_2S$ emission, comprising an inert reinforcer/carrier, a support material deposited on said reinforcer and a platinum group metal deposited on said support material, said support material having been made by forming an aqueous suspension of 0 to 90 parts by weight of an active aluminum oxide and/or its particular precursor and 10 to 100 parts by weight of a cerium oxide or a soluble or insoluble precursor of cerium oxide calculated as $CeO_2$ and spray drying said suspension to form spray dried support material particles, annealing said support material particles for a period of time of 15 minutes to 24 hours at a temperature of 350° to 1140° C.

17. A three way catalyst for the purification of exhaust gases of an internal combustion engine, which catalyst has a reduced tendency for $H_2S$ emission, comprising an inert reinforcer/carrier, a support material deposited on said reinforcer and a platinum group metal deposited on said support material, said support material having been made by forming an aqueous suspension ob 0 to 90 parts by weight of an active aluminum oxide and/or its particular precursor and 10 to 100 parts by weight of a cerium oxide or a soluble or insoluble precursor of cerium oxide calculated as $CeO_2$ and spray drying said suspension to form spray dried support material particles, annealing said support material particles for a period of time of 15 minutes to 24 hours at a temperature of 350° to 1140° C. and combining 100 parts by weight of the sprayed dried support material after annealing with up to 80 parts by weight of a conventional gamma-aluminum oxide or of a precursor of the same and/or of a conventional cerium oxide, calculated as $CeO_2$, or of one of its soluble and/or insoluble precursors.

* * * * *